United States Patent
Dong et al.

(10) Patent No.: US 10,984,052 B2
(45) Date of Patent: Apr. 20, 2021

(54) SYSTEM AND METHOD FOR MULTIPLE-CHARACTER WILDCARD SEARCH OVER ENCRYPTED DATA

(71) Applicants: Beijing Jingdong Shangke Information Technology Co., Ltd., Beijing (CN); JD.com American Technologies Corporation, Mountain View, CA (US)

(72) Inventors: Qiuxiang Dong, Mountain View, CA (US); Yueh-Hsun Lin, Mountain View, CA (US); Wei Gao, Mountain View, CA (US); Jimmy Su, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 248 days.

(21) Appl. No.: 16/195,733

(22) Filed: Nov. 19, 2018

(65) Prior Publication Data
US 2020/0159779 A1 May 21, 2020

(51) Int. Cl.
G06F 21/00 (2013.01)
G06F 16/903 (2019.01)
G06F 16/31 (2019.01)
H04L 9/06 (2006.01)

(52) U.S. Cl.
CPC ...... *G06F 16/90335* (2019.01); *G06F 16/313* (2019.01); *H04L 9/0631* (2013.01); *H04L 9/0643* (2013.01)

(58) Field of Classification Search
CPC ............ G06F 16/90335; G06F 16/313; H04L 9/0631; H04L 9/0643; H04L 9/08; H04L 9/14; H04L 9/3236
See application file for complete search history.

(56) References Cited

U.S. PATENT DOCUMENTS

| | | | |
|---|---|---|---|
| 5,276,616 A | * | 1/1994 | Kuga .................... G06F 16/313 704/10 |
| 8,429,421 B2 | | 4/2013 | Chase et al. |
| 8,549,653 B2 | | 10/2013 | Kunde et al. |
| 8,930,691 B2 | | 1/2015 | Kamara et al. |

(Continued)

OTHER PUBLICATIONS

Zhao et al. "Searchable Symmetric Encryption Supporting Queries with Multiple-Character Wildcards". International Conference on Network and System Security, 266-282. (Year: 2016).*

(Continued)

*Primary Examiner* — Sarah Su
(74) *Attorney, Agent, or Firm* — China Science Patent & Trademark US LLC; Shanyun Lu

(57) ABSTRACT

A method and system for searching encrypted data using wildcard keywords. The method includes: obtaining, by a first computing device, a keyword for data to be encrypted, where the keyword has a fixed length; generating a sequence of primes; determining corresponding one prime from the sequence of primes for each character of the keyword; and defining a product of the corresponding primes of the characters of the keyword as index of the encrypted data, where the index can be searched using a wildcard search keyword.

20 Claims, 8 Drawing Sheets

(56) References Cited

U.S. PATENT DOCUMENTS

| | | | | |
|---|---|---|---|---|
| 9,679,155 | B1 | 6/2017 | Grubbs | |
| 9,760,637 | B2 | 9/2017 | Grubbs | |
| 2009/0113213 | A1* | 4/2009 | Park | G06F 16/313 |
| | | | | 713/189 |
| 2014/0233727 | A1 | 8/2014 | Rohloff et al. | |
| 2015/0207785 | A1* | 7/2015 | Sathaye | H04L 9/3215 |
| | | | | 713/168 |
| 2017/0061151 | A1* | 3/2017 | Baessler | H04L 9/14 |
| 2019/0207763 | A1* | 7/2019 | Jin | H04L 9/083 |

OTHER PUBLICATIONS

Boneh, Dan, et al., Public key encryption with keyword search, International conference on the theory and applications of cryptographic techniques, 2004, 3027: 506-522.

Boldyreva, Alexandra, et al., Order-preserving symmetric encryption, Annual International Conference on the Theory and Applications of Cryptographic Techniques, 2009, 5479: 224-241.

Cash, David, et al., Highly-scalable searchable symmetric encryption with support for boolean queries, Advances in cryptology—CRYPTO 2013, 2013, 8042: 353-373.

Cash, David, et al., Dynamic searchable encryption in very-large databases: data structures and implementation, 2014, IACR Cryptology ePrint Archive, 2014: 853.

Zhao, Fanming and nishide, takashi, Searchable Symmetric Encryption Supporting Queries with Multiple-Character Wildcards, International Conference on Network and System Security, 2016, 266-282.

https://en.wikipedia.org/wiki/Fisher-Yates_shuffle, Nov. 19, 2018.

https://nlp.stanford.edu/IR-book/html/htmledition/permuterm-indexes-1.html, Nov. 19, 2018.

https://en.wikipedia.org/wiki/Random_number_generation, Nov. 19, 2018.

https://en.wikipedia.org/wiki/Varchar, Oct. 10, 2018.

https://en.wikipedia.org/wiki/Pairing, Nov. 18, 2018.

* cited by examiner b'\xb7\xa5\xbd/\x0cH\xb5\xceP\x1c\xe4\xe2\xf6^_O'

FIG. 3A b'\x82\xb0-\xa5\x1e\x8e\xdf\xe8xJ\xf4\xe2\xc6\xb2\tf'

SYSTEM AND METHOD FOR MULTIPLE-CHARACTER WILDCARD SEARCH OVER ENCRYPTED DATA

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to data encryption and search encrypted data, and more particularly to systems and methods for performing multiple-character wildcard search against encrypted data so as to retrieve related data only from the encrypted data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Data leakage happens frequently and brings great losses to both companies and customers. Therefore, more and more data are stored in encrypted format. Considering efficiency, usually data are encrypted by symmetric encryption schemes, e.g., Triple Data Encryption Standard (3DES) or Advanced Encryption Standard (AES). In some cases, data might be encrypted by asymmetric encryption schemes, e.g., Rivest-Shamir-Adleman (RSA). For achieving provable security, all the conventional encryption schemes achieve indistinguishability (IND) security. In particular, a probabilistic polynomial time (PPT) attacker cannot distinguish two ciphertexts based on the messages he encrypted. In another word, the ciphertext is a random value to an entity without the decryption key (the secret key in the symmetric setting or the private key in the asymmetric setting).

Therefore, if the data are encrypted by conventional encryption schemes, a server without the decryption key cannot perform searches on the data anymore. To search over the encrypted data, data owner has to download all the data, decrypt the data locally and then search over the plaintexts all by himself. This brings the following issues. First, the communication overhead is high, especially in the era of big data, the data size might be on the gigabyte (GB), terabyte (TB) level. Second, the client side has to store the downloaded ciphertexts, which is costly for resource-constrained devices. Third, the client side has to decrypt all ciphertexts and decryption is computationally heavy, thus bringing great burdens to the client end and it will be very time-consuming or even not practical for resource-constrained devices.

Therefore, an unaddressed need exists in the art to provide a lightweight and easy-to-use key management between client and server.

SUMMARY

In certain aspects, the present disclosure relates to a method for providing wildcard keyword search upon encrypted data. In certain embodiments, the method includes:

providing, by a first computing device, a data encryption key (DEK);

providing, by the first computing device, data for being encrypted, wherein the data comprises a keyword having M number of characters, each of the characters is selected from N number of predetermined characters, and M and N are positive integers;

encrypting, by the first computing device, the data into encrypted data using the DEK;

calculating, by the first computing device, an index encryption key (IEK) from the DEK using a key derivation function (KDF);

providing M×N number of primes;

shuffling the M×N number of primes based on the IEK to form a sequence of primes;

calculating, for each character in the keyword, a sequential value according to a position of the character in the keyword and a value of the character in the keyword;

selecting a prime from the sequence of primes for each character in the keyword according to the sequential value;

calculating an index of the keyword, the index being a product of the primes selected for the characters of the keyword; and uploading the encrypted data and the index on the second computing device, such that the encrypted data and the index are accessible by a third computing device, wherein the third computing device has the DEK and KDF, and is configured to: generate the IEK according to the DEK and the KDF; provide a wildcard search keyword, where the wildcard search keyword has M number of characters, the M number of characters comprises at least one query character and at least one wildcard character, and the at least one query character is selected from the N number of predetermined characters; provide the M×N number of primes; shuffle the M×N number of primes based on the IEK to form the sequence of primes; calculate a query sequential value for the at least one query character according to a position and a value of the at least one query character in the wildcard search keyword; select a prime from the sequence of primes for the at least one query character in the wildcard search query according to the query sequential value; calculate a query index of the wildcard search keyword, the query index being a product of the primes selected for the at least one query character of the wildcard search keyword; and query the index stored in the second computing device using the query index, so as to obtain the encrypted data corresponding to the index that matches the query index. In certain embodiments, the search keyword includes multiple wildcard characters.

In certain embodiments, the sequential value for a character in a pth position in the keyword is calculated by: $p \times (M-1) + C \% N$, wherein p is an integer selected from 0 to N and representing a position of the character in the keyword, C is the character value in the pth position, and $C \% N$ is the remainder of dividing C by N. In certain embodiments, the sequential value for the character in the pth position in the keyword can also be calculated by: $p \times (M-1) + C$, that is, using C to replace $C \% N$, which provides the same result.

In certain embodiments, the first computing device is a data provider, the second computing device is a storage server, and the third computing device is a data consumer; and the first computing device is configured to perform storage operations to the second computing device, and the third computing device is configured to send the query index to the second computer and receive a search response from the second computing device.

In certain embodiments, the method further includes: updating the DEK on the first computing device and the second computing device at a predetermined time interval. In certain embodiments, when the DEK is updated, the permutation of M×N prime matrix would be changed. Under this situation, the method further includes reverting matrix based on both the old DEK and the new DEK. In certain embodiments, the way to calculate the mapping prime could be replaced with new mapping derived from the new DEK (based on the IEK). Therefore, if character c in pth position maps to prime p1 (new DEK), the method builds a transition function using two DEKs to map c in path position to prime p2 (original prime), such that the update of the DEK does not change the index calculated for a corresponding keyword.

In certain embodiments, the DEK is an advanced encryption standard (AES) key, and the KDF is a SHA-256 hash value function.

In certain embodiments, the N number of predetermined characters comprises at least one of numbers 0 to 9, lowercase characters a to z, and uppercase characters A to Z.

In certain embodiments, the step of shuffling the M×N number of primes is performed by Fisher-Yates shuffle using the IEK as seeds.

In certain embodiments, the step of query the index includes: performing a modulus operation on the query index to the indexes stored in the second computing device; and when the modulus of the query index and one of the indexes stored in the second computing device is 0, delivering the encrypted data corresponding to the one of the indexes from the second computing device to the third computing device.

In certain aspects, the present disclosure relates to a method for providing wildcard keyword search upon encrypted data. The method includes:

obtaining, by a first computing device, a keyword for data to be encrypted, where the keyword has a fixed length;

generating a sequence of primes;

determining corresponding one prime from the sequence of primes for each character of the keyword; and defining a product of the corresponding primes of the characters of the keyword as index of the encrypted data, where the index is searchable using a wildcard search keyword.

In certain embodiments, the keyword has M number of characters, each of the characters is selected from N number of predetermined characters, M and N are positive integers, and the sequence of primes comprises M×N number of primes.

In certain embodiments, the method further includes:

encrypting the data using a data encryption key (DEK) to obtain the encrypted data;

processing the DEK using a key derivation function (KDF) to obtain an index encryption key (IEK);

obtaining sequentially increasing M×N number of primes from the prime number 1; and shuffling the sequentially increasing M×N number of primes, using random shuffling with the IEK as seeds, to obtain the sequence of primes.

In certain embodiments, the step of determining corresponding one prime from the sequence of primes for each character of the keyword includes: calculating, for each character in the keyword, a sequential value using p×(M−1)+C % N, where p is an integer selected from 0 to N and representing a position of the character in the keyword, C is the character value in the pth position, and C % N is the remainder of dividing C by N; and selecting, for each character in the keyword, a prime at a position of the sequential value in the sequence of primes. In certain embodiments, the sequential value is calculated using p×(M−1)+C.

In certain embodiments, the wildcard search keyword has M number of characters, the M number of characters comprises at least one query character and at least one wildcard character, and the at least one query character is selected from the N number of predetermined characters.

In certain embodiments, the method further includes: uploading the index and the encrypted data onto a storage server; calculating a query sequential value for at least one query character of the wildcard search keyword according to a position and a value of the at least one query character in the wildcard search keyword; calculating a query index of the wildcard keyword, the query index being a product of the primes selected for the at least one query character of the wildcard search keyword; and querying the index on the storage server using the query index.

In certain embodiments, the method further includes, when the query index matches the index on the storage server: downloading encrypted data corresponding to the index.

In certain aspects, the present disclosure relates to a non-transitory computer readable medium storing computer executable code, where the computer executable code, when executed at a processor of a computing device, is configured to perform the method described above.

In certain aspects, the present disclosure relates to a system for providing wildcard keyword search upon encrypted data. The system includes a first computing device. The first computing device includes a processor and a storage device storing computer executable code. The computer executable code, when executed at the processor, is configured to:

obtain a keyword for data to be encrypted, where the keyword has a fixed length;

generate a sequence of primes;

determine corresponding one prime from the sequence of primes for each character of the keyword; and define a product of the corresponding primes of the characters of the keyword as index of the encrypted data, wherein the index is searchable using a wildcard search keyword.

In certain embodiments, the keyword has M number of characters, each of the characters is selected from N number of predetermined characters, M and N are positive integers, the sequence of primes comprises M×N number of primes, and the computer executable code is further configured to:

encrypt the data using a data encryption key (DEK) to obtain the encrypted data;

process the DEK using a key derivation function (KDF) to obtain an index encryption key (IEK);

obtaining sequentially increasing M×N number of primes from 1; and shuffling the sequentially increasing M×N number of primes, using random shuffling with the IEK as seeds, to obtain the sequence of primes.

In certain embodiments, the computer executable code is configured to determining corresponding one prime from the sequence of primes for each character of the keyword by: calculating, for each character in the keyword, a sequential value using p×(M−1)+C % N, wherein p is an integer selected from 0 to N and representing a position of the character in the keyword, C is the character value in the pth position, and C % N is the remainder of dividing C by N; and selecting, for each character in the keyword, a prime at a position of the sequential value in the sequence of primes.

In certain embodiments, the wildcard search keyword has M number of characters, the M number of characters comprises at least one query character and at least one wildcard character, and the at least one query character is selected from the N number of predetermined characters, and wherein the computer executable code is further configured to:

upload the index and the encrypted data onto a storage server;

calculate a query sequential value for at least one query character of the wildcard search keyword according to a position and a value of the at least one query character in the wildcard search keyword;

calculate a query index of the wildcard keyword, the query index being a product of the primes selected for the at least one query character of the wildcard search keyword;

query the index on the storage server using the query index; and when the query index matches the index on the storage server: download the encrypted data corresponding to the index.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 3A schematically depicts a 16 bytes data encryption key (DEK) according to certain embodiments of the present disclosure.

FIG. 3B schematically depicts a 16 bytes index encryption key (IEK) according to certain embodiments of the present disclosure.

FIG. 4A schematically depicts a 10×11 prime array according to certain embodiments of the present disclosure.

FIG. 4B schematically depicts a 10×11 shuffled prime array according to certain embodiments of the present disclosure.

DETAILED DESCRIPTION

Figure 1:
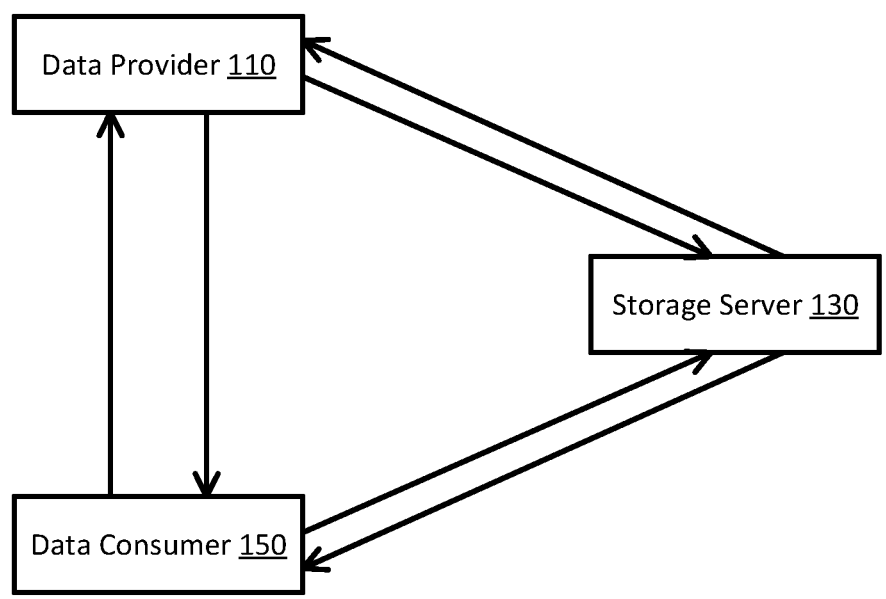
FIG. 1 schematically depicts a system architecture according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspect, the present disclosure provides a system for encrypting data and storing encrypted data, and retrieving and decrypting data, where the encrypted data are searchable using wildcard search or wildcard keyword search. FIG. 1 schematically shows a system architecture according to certain embodiments of the present disclosure. As shown in FIG. 1, the system 100 includes a data provider 110, a storage server 130, and a data consumer 150.

The data provider 110 is configured to provide the plaintext data and encrypts the data before storing them on the storage server 130. The data provider 110 is further configured to choose keywords for the data. Specifically, the data provider 110 is configured to encrypt the plaintext data using a data encryption key (DEK) to obtain encrypted data, encrypt the keywords using an index encryption algorithm to obtain index, and upload the encrypted data and the index of the encrypted data onto the storage server 130. In certain embodiments, the data provider 110 is configured to perform storage operations, where the storage operations include adding, deleting and modifying the data.

The storage server 130 is configured to provide data storage service to the data provider 110 and data access and data search service to the data consumer 150. In certain embodiments, the search operations are performed over the encrypted data.

The data consumer 150 is either the data provider 110 itself or an entity with the secret key shared by the data provider 110. The data consumer 150 is configured to generate a search token and sends a search query to the storage server 130 to filter out irrelevant data before downloading the encrypted data. In certain embodiments, the search query is a wildcard keyword search.

In certain embodiments, each of the data provider 110, the storage server 130 and the data consumer 150 is a server computing device, a cloud computing device, or a general purpose computer. As show in FIG. 1, the data provider 110 and the data consumer 150 are separate servers. In certain embodiments, the data provider 110 and the data consumer 150 may be the same server. In certain embodiments, any of the data provider 110, the storage server 130, and the data consumer 150 are located in the cloud.

In certain embodiments, the data provider 110, the storage server 130 and the data consumer 150 are configured to communicate with each other, for example through a network or other types of interfaces. In certain embodiments, each of the above mentioned networks may be a wired or wireless network, and may be of various forms, such as a public network and a private network. Examples of the networks may include, but not limited to, a local-area network (LAN) or a wide area network (WAN) including the Internet. In certain embodiments, two or more different networks and/or interfaces may be applied to connect the devices 110, 130 and 150. In certain embodiment, the network may also be a system interface or a universal serial bus (USB) interface.

Figure 2:
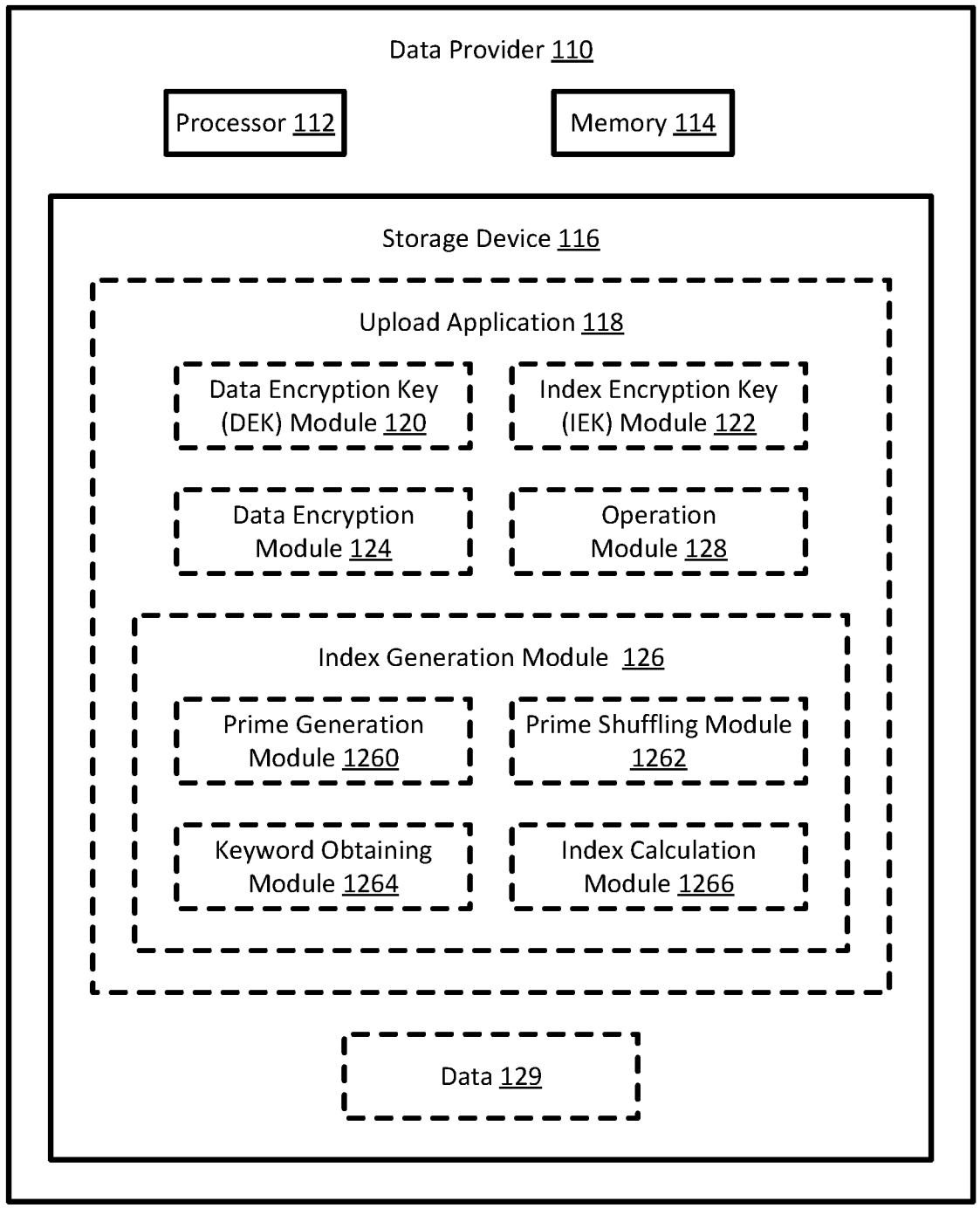
FIG. 2 schematically depicts a data provider according to certain embodiments of the present disclosure.

FIG. 2 schematically depicts a data provider according to certain embodiments of the present disclosure. In certain embodiments, the data provider 110 may be a mobile device, a tablet, a cloud computer, a general-purpose computer, a headless computer, a wearable device, or a specialized computer, which provides storage operations on the storage server 130. As shown in FIG. 2, the data provider 110 may include, without being limited to, a processor 112, a memory 114, and a storage device 116. In certain embodiments, the data provider 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the data provider 110. The processor 112 can execute an operating system (OS) or other applications of the data provider 110. In some embodiments, the data provider 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the data provider 110. In certain embodiments, the memory 114 may be a volatile memory array. In certain embodiments, the data provider 110 may run on more than one memory 114. The storage device 116 is a non-volatile data storage media for storing the OS (not shown) and other applications of the data provider 110. Examples of the storage device 116 may include non-volatile memory such as flash memory, memory cards, USB drives, hard drives, floppy disks, optical drives, solid-state drive (SSD), or any other types of data storage devices. In certain embodiments, the storage device 116 may be a local storage, a remote storage, or a cloud storage. In certain embodiments, the data provider 110 may have multiple storage devices 116, which may be identical storage devices or different types of storage devices, and the applications of the data provider 110 may be stored in one or more of the storage devices 116 of the data provider 110.

As shown in FIG. 2, the storage device 116 includes an upload application 118 and data 129 for encryption. The upload application 118 is configured to perform storage operations. Specifically, the upload application 118 is configured to obtain data, define keywords for the data, encrypt data into encrypted data, encrypt keywords to indexes of the data, and upload encrypted data and the indexes to the storage server 130. The upload application 118 may further include adding, deleting, and modifying the data on the storage server 130. The upload application 118 includes, among other things, a data encryption key (DEK) module 120, an index encryption key (IEK) module 122, a data encryption module 124, an index generation module 126, and an operation module 128.

Figures 3A, 3B, 4A, 4B:
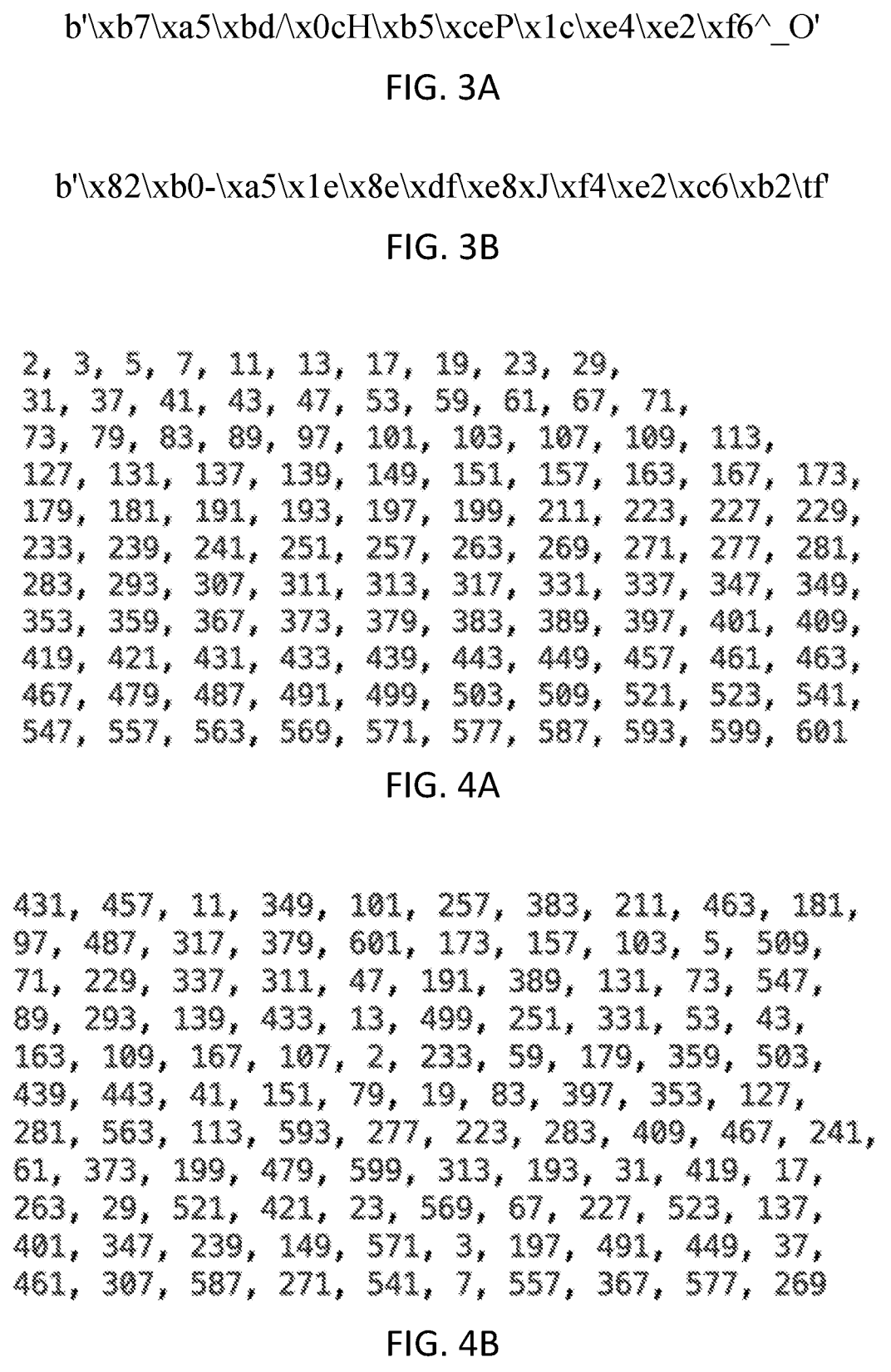

The DEK module 120 is configured to generate a data encryption key (DEK), and send the DEK to the IEK module 122 and the data encryption module 124. In certain embodiments, the DEK module 120 is configured to share the DEK with the data consumer 150. In certain embodiments, the DEK module 120 is configured to update the DEK in a predetermined time interval, and communicate the updated DEK with the data consumer 150. In certain embodiments, the DEK module 120 is an Advanced Encryption Standard (AES) generator and the generated DEK is a random AES key. In one example, FIG. 3A shows a 16 bytes DEK.

The IEK module 122 is configured to, upon receiving the DEK from the DEK module 120, generate an IEK, and send the IEK to the index generation module 126. In certain embodiments, the IEK module 122 is configured to generate the IEK by performing a key derivation function (KDF) on DEK, i.e., IEK=KDF (DEK). In certain embodiments, the KDF function can be any secure hash functions, for example SHA-256. In one example, a hash-based message authentication code (HMAC) is run on the DEK shown in FIG. 3A, so as to obtain a 16 bytes IEK shown in FIG. 3B.

The data encryption module 124 is configured to, upon receiving the DEK from the DEK module 120, encrypt data 129 to form encrypted data, and send the encrypted data to the operation module 128.

The index generation module 126 is configured to, upon receiving the IEK from the IEK module 122, obtain keywords for the data 129, and encrypt the keywords into indexes. The index generation module 126 includes a prime generation module 1260 for generating an array of primes, a prime shuffling module 1262 for shuffling the primes, a keyword obtaining module 1264 to obtain keywords from the data 129, and an index calculation module 1266 for calculating indexes of the keywords using the shuffled primes.

The prime generation module 1260 is configured to generate a number of N×M primes, where N is the character size of the characters in the keywords, and M is the length of the keywords, and send the generated N×M primes to the prime shuffling module 1262. The N×M primes may be arranged as an N×M array, or simply a sequence of numbers. The N×M array of primes include M rows of prime numbers, and each row of the primer numbers include N prime numbers. In certain embodiments, the keywords are 11 digit U.S. telephone numbers, each character in the telephone number could be any of {0, 1, . . . , 9}. Therefore, the number N is 10 indicating the set 0-9, and the number M is 11, the length of the telephone number. In certain embodiments, the key words are names of customers, for which the N is 52 including capital and lower case a-z, and M is an arbitrary length such as 40. In certain embodiments, the keywords may be social security numbers, yin numbers. The requirements for using the encrypted indexing method according to certain embodiments of the disclosure is to have a definite number of characters and a definite number of length of the keywords. In other embodiments, variation of the method can be used for indexing the keywords with indefinite number of characters and indefinite number of length of the keywords. With N and M available, the prime generation module 1260 is configured to generate the first N×M primes. FIG. 4A shows an example of the first 10×11=110 primes, where keywords are telephone numbers having character size of 10 and a length of 11 digits. The 110 primes are arranged in an array, with 10 prime numbers in a row and a total of 11 rows. In certain embodiments, the primes may be obtained from an arbitrary number instead of the first prime, for example, the 110 primes may be start from the prime number 5 instead of the prime number 2. In certain embodiments, the primes may not be obtained sequentially. For example, the prime generation module 1260 may choose every other primes, so as to obtain 110 primes of 2, 5, 11, 17, . . . . In certain embodiments, the prime generation module 1260 may choose to jump one primes, then jump two primes, and then jump three primes, so as to obtain 110 primes of 2, 5, 13, 29 . . . . The prime generation module 1260 may make a variety of modifications for choosing the primes, as long as the modification is shared with the corresponding module in the data consumer 150.

The prime shuffling module 1262 is configured to, upon receiving the N×M primes from the prime generation module 1260, shuffling the N×M primes to obtain shuffled primes, and send the shuffled primes to the index calculation module 1266. In certain embodiments, the prime shuffling module 1262 performs the shuffling using Fisher-Yates shuffle. In certain embodiments, the prime shuffling module 1262 is configured to perform the shuffling using IEK as seeds. In certain embodiments, the prime shuffling module 1262 shuffles the array of primes of n elements (indices 0, . . . , n−1) as follows:

```
Random rd = SecureRandom (seeds = IEK)
    //Use IEK as seeds to generate pseudorandom numbers
for i from n−1 down to 1 do
    j ←pseudorandom random integer such that 0 ≤ j ≤ i generated by
        rd exchange a[j] and a[i]
``` where SecureRandom can provide a cryptographically strong random number generator (RNG). Referring to FIG. 4B, a shuffling operation of the primes of FIG. 4A generate a shuffled 10×11 primes according to one embodiment of the present disclosure.

The keyword obtaining module 1264 is configured to retrieve or extract keywords from the data 129, and send the keywords to the index calculation module 1266. In certain embodiments, the data 129 is in a form of a database or table, and the keywords to be extracted may be one item type or one column of the data 129. For example, the data 129 may be customer information, and the extracted keywords could be telephone numbers of the customers, social security numbers of the customers, customer names, etc.

The index calculation module 1266 is configured to, upon receiving the shuffled primes from the prime shuffling module 1262 and the keywords from the keyword obtaining module 1264, calculate the indexes of the keywords based on the shuffled primes, and send the calculated indexes to the operation module 128. In certain embodiments, the index calculation module 1266 is configured to calculate an index of a keyword through the following two steps: determining a prime for each character in the keyword, and then obtaining a product of the primes for each character in the keyword. The product is the index of the keyword. In certain embodiments, the prime for each character is chosen based on the position and the value. More specifically, the prime number chosen for numeric character c on position p (starting from 0) is primes[p*(M−1)+c % N]. In an example where phone number is the keywords, for a keyword "13445457890," the chosen primes are:

For "1" on position 0: primes[0*10+1%10]=primes[1]=457
For "3" on position 1: primes[1*10+3%10]=primes[13]=379
For "4" on position 2: primes[2*10+4%10]=primes[24]=47
For "4" on position 3: primes[3*10+4%10]=primes[34]=13
For "5" on position 4: primes[4*10+5%10]=primes[45]=233
For "4" on position 5: primes[5*10+4%10]=primes[54]=79
For "5" on position 6: primes[6*10+5%10]=primes[65]=223
For "7" on position 7: primes[7*10+7%10]=primes[77]=31
For "8" on position 8: primes[8*10+8%10]=primes[88]=523
For "9" on position 9: primes[9*10+9%10]=primes[99]=37
For "0" on position 10: primes[10*10+0%10]=primes[100]=461

In certain embodiments, if the character is an alphabetic character, then each element in the alphabet set needs to be converted into numeric value. For example, if the keyword consists of lower case alphabets a-z, then the value of each character ch will be ch−'a' (for example, if ch='c', the ch is converted into value 2 by evaluating 'c'−'a'=2). Then the chosen prime will be primes[p*(M−1)+(ch−'a')%26] or primes[p*(M−1)+(ch−'a')%52] if case sensitive.

With the prime numbers for each character in the keyword 13445457890 determined, the index calculation module 1266 is further configured to obtain the index of the keyword by timing the primes. Specifically, the index is calculated by:

$$PRODUCT = 457*379*47*13*233*79*223*31*523*37*461 =$$
$$120129737422987999964933$$

As a result, the index calculation module 1266 determines that the index of the keyword 13445457890 is 120129737422987999964933. By the same method, the index calculation module 1266 determines the indexes for all the keywords in the data, and the indexes corresponding to all the telephone numbers in the data 129. In certain embodiments, the index calculation module 1266 is configured to generate different sets of indexes for the data 129. For example, one set of indexes correspond to the telephone numbers, another set of indexes correspond to social security numbers, and yet another set of indexes correspond to names.

In certain embodiments, the product of the value of M biggest primes (denoted by PM) is larger than the range of integer values that can be stored on a database server. Denote the biggest value by MAX, then the above-mentioned scenario is PM>MAX. Thus, making the product of all the chosen primes for a keyword might be beyond the range of integers stored in the database. For example, the product of all the chosen primes in the above example would be:

$$PRODUCT = 457*379*47*13*233*79*223*31*523*37*461 =$$
$$120129737422987999964933$$

PRODUCT is bigger than the maximum value of BIGINT denoted by MAX=18446744073709551616 in MySQL, so PRODUCT cannot be stored as an integer in MySQL database.

In certain embodiments, the present disclosure provides two approaches to deal with this issue. In one approach, the index calculation module 1266 is configured to store PRODUCT as a varchar, which will need a user defined function to perform the search operation in the search phase. In the other approach, the index calculation module 1266 is configured to cut the encoded keywords into multiple pieces, encrypt and store the corresponding encrypted index as separate field in the database. The number of separate filed (denoted by NumF) depends on the size of character set and the length of the keyword. In certain embodiments, the algorithm of how to calculate the number of separate fields is illustrated as follows using the set of prime numbers primes [N*M] in an increasing order described above:

```
product = 1
i = N*M−1
while product < MAX do
    product = product * primes[i]
    i = i−1
return NumF = [ M / (N*M−1−i) ]
```

With NumF, the encrypted index will be an array, denoted by PRODUCT_ARR with length NumF. The following is the way to calculate PRODUCT_ARR.

```
Initialize all the values in PRODUCT_ARR to be 1
Initialize i to be 0
while i< ⌊M/NumF⌋
    for j=i*NumF up to i*NumF+NumF-1
PRODUCT_ARR[i] = PRODUCT_ARR[i] * primes[j*(M-1) + c%N]
If i*NumF < M
    for j = i*NumF up to M-1
        PRODUCT_ARR[i+1] = PRODUCT_ARR[i+1] *
        primes[j*M-1) + c%N]
```

To encrypt a 11 digits phone number, the product of the biggest seven primes will be bigger than MAX. Therefore NumF=⌈11/6⌉=2.

PRODUCT_ARR[0]=primes[0*10+1%10]*primes
[1*10+3%10]*primes[2*10+4%10]*primes
[3*10+4%10]*primes[4*10+5%10]*primes
[5*10+4%10]=1947958196431.

PRODUCT_ARR[1]=primes[6*10+5%10]*primes
[7*10+7%10]*primes[8*10+8%10]*primes
[9*10+9%10]*primes[10*10+0%10]=
61669566443.

Depending on the application scenarios, there will be a threshold value (Thr) for NumF since if NumF is too big, the storage on the database might be wasted. Based on the application, in conclusion, the process to determine how to store the index is shown as follows according to certain embodiments.

```
If PM <= MAX : Store PRODUCT as an integer in the database;
If PM > MAX and NumF < Thr: Calculate PRODUCT_ARR and
store each element as an integer in the database;
    Else If PM > MAX and NumF >= Thr: Store PRODUCT as a
longtext in the database.
```

As shown above, the PRODUCT may be stored as a longtext, and the longtext can be converted back to a huge integer for calculation later.

The index calculation module 1266 is configured to, after generating indexes for each of the keywords of the data 129, send the indexes to the operation module 128.

Figure 5:
FIG. 5 schematically depicts an encrypted data and its corresponding indexes stored on a storage server according to certain embodiments of the present disclosure.

The operation module 128 is configured to, upon receiving the encrypted data from the data encryption module 124 and the indexes of the data from the index calculation module 1266, send an upload request together with the encrypted data and the indexes of the data, onto the storage server 130 for storage. FIG. 5. shows a form of data stored on the storage server 130, where the data itself is encrypted, and the keywords of the data are encrypted to indexes, where each of the index 1, index 2, . . . , index n corresponds to one of the keywords. In certain embodiments, the operation module 128 may further send adding, deleting, and modifying requests to the data storage server 130, so as to perform those operations to the data that has been stored in the data storage server 130.

Figure 6:
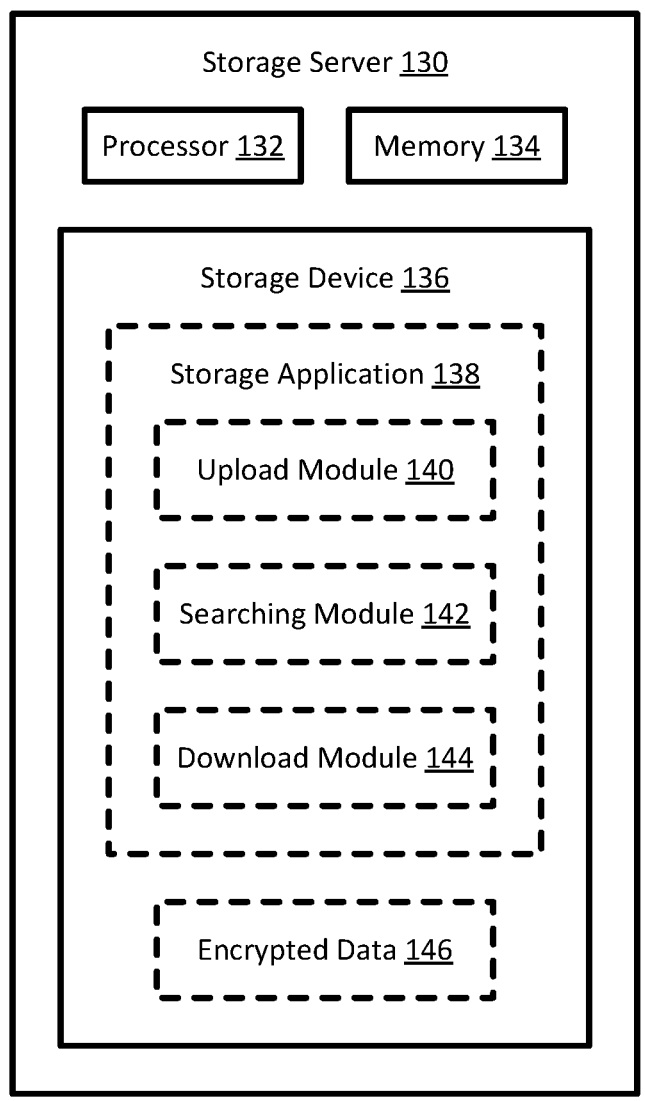
FIG. 6 schematically depicts a storage server according to certain embodiments of the present disclosure.

FIG. 6 schematically depicts the structure of the storage server according to certain embodiments of the present disclosure. As shown in FIG. 6, the storage server 130 includes a processor 132, a memory 134, and a storage device 136. The description of the processor 132, the memory 134 an the storage device 136 is similar to that of the processor 112, the memory 112, and the storage device 116. However, the storage 136 may have a greater storage space for storing a large amount of data for a long time, and the storage server 130 may include specific management applications to manage the storage of data in the storage device 136.

Referring to FIG. 6, the storage device 136 includes a storage application 138 and encrypted data 146. The storage application 138 is configured to communicate with the data provider 110 to upload data from the data provider 110, and communicate with the data consumer 150 for downloading data to the data consumer 150. The encrypted data 146 may include a large amount of data, which may include encrypted data and optionally unencrypted data, and a set of encrypted data may have the form shown in FIG. 5. The storage application 138 includes, among other things, an upload module 140, a searching module 142 and a download module 144.

The upload module 140 is configured to, upon receiving the uploading request, the encrypted data, and the indexes of the data sent by the operation module 128, store the encrypted data and the indexes to the storage device 136. In certain embodiments, upon request of adding, deleting, and modifying requests sent by the operation module 128, the upload module 140 is further configured to perform those operations to the stored data.

The searching module 142 is configured to, upon receiving a search request having one or more tokens from the data consumer 150, search the token against the indexes of the encrypted data 146 to find matched indexes, locate the encrypted data corresponding to the matched indexes, and send the encrypted data or the location of the corresponding encrypted data to the download module 144. Specifically, for each index value a and a token value b, the searching module 142 calculates a % b. When the value of the calculated a % b is 0, the searching module 142 determines that the token matched the index, and when the calculated a % b is not 0, the searching module 142 determines that the token doesn't match the index.

The download module 144 is configured to, upon receiving the locations of the corresponding encrypted data (or the corresponding encrypted data), send the corresponding encrypted data to the data consumer 150.

In certain embodiments, the search module 142 is further configured to send the search result to the download module 144, and the download module 144 is further configured to send the search result to the data consumer 150, so that the data consumer 150 may evaluate the search result and evaluate different set of downloaded encrypted data.

Figure 7:
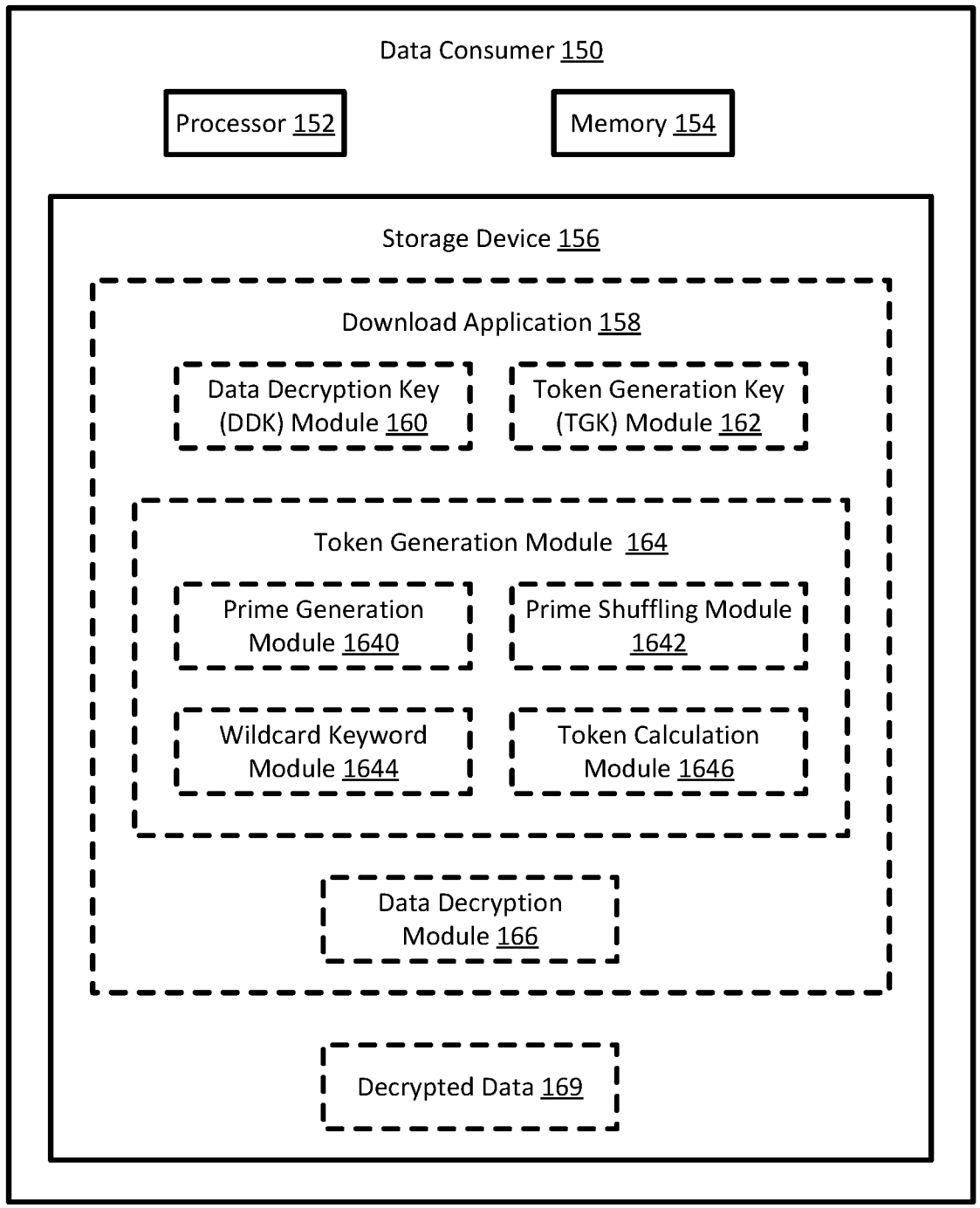
FIG. 7 schematically depicts a data consumer according to certain embodiments of the present disclosure.

FIG. 7 schematically depicts the structure of the data consumer according to certain embodiments of the present disclosure. As shown in FIG. 7, the data consumer 150 includes a processor 152, a memory 154, and a storage device 156. The description of the processor 152, the memory 154 an the storage device 156 is similar to that of the processor 112, the memory 112, and the storage device 116.

The storage device 156 includes a download application 158 and decrypted data 169. The download application 158 is configured to communicate with the storage server 130 to search the encrypted data on the storage server 130 and download related encrypted data from the storage server 130, and decrypt the downloaded data to form the decrypted data 166. The download application 158 includes, among other things, data decryption key (DDK) module 160, a token generating key (TGK) module 162, a token generation module 164, and a data decryption module 166.

The DDK module 160 is configured to communicate with the DEK module 120 of the data provider 110 to receive or obtain the DEK from the DEK module 120. The obtained DEK is named data decryption key (DDK). The DEK for data encryption and the DDK for data decryption are symmetric keys. The DDK module 160 is further configured to send the DDK to the TGK module 162 and the data decryption module 166. Further, the DDK in the DDK module 160 is accessible by the data decryption module 166 for decrypting data.

The TGK module 162 is configured to, upon receiving the DDK from the DDK module 160, generate an TGK, and send the TGK to the token generation module 164. The TGK module 162 is configured to generate the TGK by performing a key derivation function (KDF) on the DDK, i.e., TGK=KDF (DDK). The KDF used by the token generation module 164 is the same as the KDF used by the IEK module 122, DDK is the same as DEK, therefore, the generated TGK is the same as the IEK of the data provider 110. In other words, the DDK and the TGK of the data consumer 150 are the same as the DEK and IEK of the data provider 110. In certain embodiments, the data provide 110 doesn't include a TGK module to generate TGK, instead, the data consumer 150 receives or retrieves both the DDK and the TGK from the data provider 110.

The token generation module 164 is configured to, upon receiving the TGK from the TGK module 162, obtain one or more keywords, and encrypt the keywords into tokens. In certain embodiments, the keyword is received from a user input via an interface provided by the data consumer 150. The token generation module 164 includes a prime generation module 1640 for generating an array of primes, a prime shuffling module 1642 for shuffling the primes, a wildcard keyword module 1644 to obtain wildcard keyword, and a token calculation module 1646 for calculating toke of the wildcard keyword using the shuffled primes.

The prime generation module 1640 is substantially the same as the prime generation module 1260 of the data provider 110, and the prime shuffling module 1642 is substantially the same as the prime shuffling module 1262 of the data provider 110. The prime generation module 1640 has the predefined N and M as character size and keyword, or receive the N and M from input by the user. The prime array generated by the prime generation module 1640 is the same as the prime array generated by the prime generation module 1260, which may be sequential primes from the smallest prime, the number 2. The shuffled prime array generated by the prime shuffling module 1642 are the same as the array generated by the prime shuffling module 1262, where TGK is used as the seed for generating random numbers for shuffling.

The wildcard keyword module 1644 is configured to receive a wildcard keyword from input by the user through the interface of the data consumer 150, and send the wildcard keyword to the token calculation module 1646. Typically, the wildcard keyword has the same length as the keyword to be searched (such as the keywords for generating the indexes), certain character positions of the wildcard keyword have definite values, while the other character positions of the wildcard keyword have wildcard symbol, such as "*." For example, a wildcard keyword for a telephone number may be "134*******0," which means the telephone number has 11 digits, the first three digits are 134, the last digit is 0, and the other 7 digits are unknown. One or more characters in a wildcard keyword may be unknown and can be replaced by wildcard symbols such as * based on available keyword information. Each wildcard symbol in the wildcard keyword represents an unknown character in a specific position of the wildcard keyword. When a wildcard keyword has more than one unknown characters, the wildcard keyword contains more than one wildcard symbols. The wildcard keyword having more than one wildcard symbols is termed a "multi-character wildcard keyword," and search based on the "multi-character wildcard keyword" is termed "multiple-character wildcard search."

The token calculation module 1646 is configured to, with the shuffled prime array available and the wildcard keyword available, get a particular prime for each non-wildcard character in the search query based on its position and value, calculate the product of the above chosen primes (the product is termed a token), and send a downloading request having one or more tokens to the storage server 130, so as to download encrypted data related to the tokens.

An example is described as follows. If PM<MAX, then the token will be an integer. For example, if the wildcard search query is "134*******0", the chosen primes will be:

For "1" on position 0: primes[0*10+1%10]=primes[1]=457

For "3" on position 1: primes[1*10+3%10]=primes[13]=379

For "4" on position 2: primes[2*10+4%10]=primes[24]=47

For "0" on position 10: primes [10*10+0%10]=primes[100]=461

The generated token is: TOKEN=457*379*47*461=3752789401

For example, if the wildcard search query is "134*******1", the chosen primes will be:

For "1" on position 0: primes[0*10+1%10]=primes[1]=457

For "3" on position 1: primes[1*10+3%10]=primes[13]=379

For "4" on position 2: primes[2*10+4%10]=primes[24]=47

For "1" on position 10: primes [10*10+1%10]=primes[101]=307

The generated token is: TOKEN=457*379*47*307=2499146087

If PM>MAX and NumF<Thr, store TOKEN as a varchar in the database.

While if PM>MAX and NumF<Thr, calculate TOKEN_ARR and store each element as an integer in the database.

Take "134*******0" as an example

TOKEN[0]=primes[0*10+1%10]*primes[1*10+3%10]*primes[2*10+4%10]=8140541

TOKEN[1]=primes[10*10+0%10]=461

Take "134*******1" as an example

TOKEN[0]=primes[0*10+1%10]*primes[1*10+3%10]*primes[2*10+4%10]=8140541

TOKEN[1]=primes[10*10+1%10]=307

In certain embodiments, when the integer values that can be stored on the storage server 130 is larger enough, the judge of whether PM>MAX and/or whether NumF<Thr is not required.

In certain embodiments, other type ow wildcard search can be provided, for example, a wildcard keyword ?134? indicates a telephone number having at least one digit before the sequential triple 134 and at least one digit after the sequential triple 134, and the length of the keyword is defined as 11 digits, the token calculation module 1646 is configured to define the wildcard keyword ?134? as seven wildcard keywords: *134*****, 134******, \*\*\*134\*\*\*\*\*, \*\*\*\*134\*\*\*\*, \*\*\*\*\*134\*\*\*, \*\*\*\*\*\*134\*\*, \*\*\*\*\*\*\*134\*, and calculate a token for each of the seven wildcard keywords.

The data decryption module 166 is configured to, upon receiving the encrypted data from the storage server 130, decrypt the downloaded data using the DDK received from the DDK module 160. The decrypted documents may be stored as the decrypted data 169.

Figure 8:
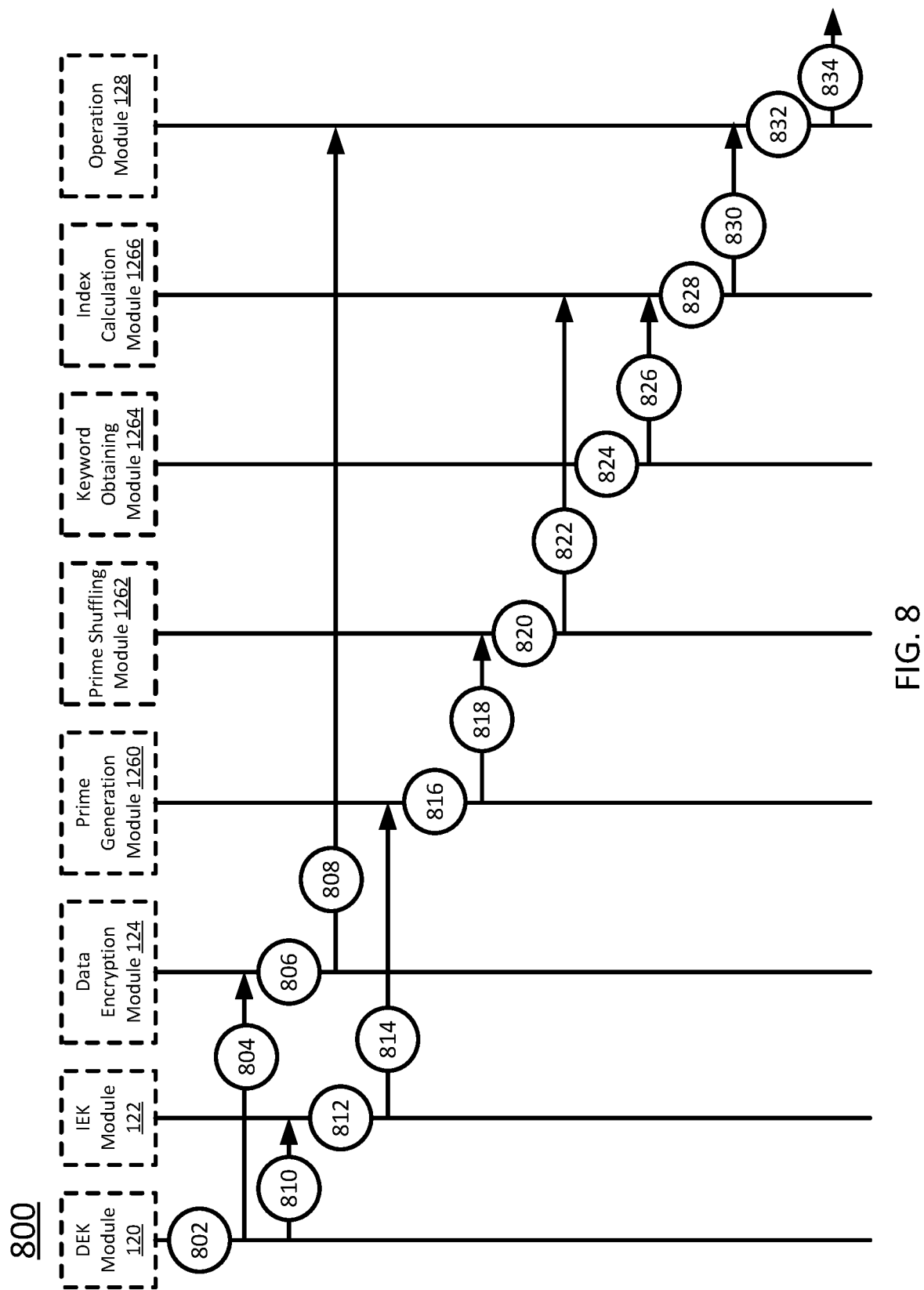
FIG. 8 schematically depicts a method of encrypting and indexing data according to certain embodiments of the present disclosure.
Figure 9A:
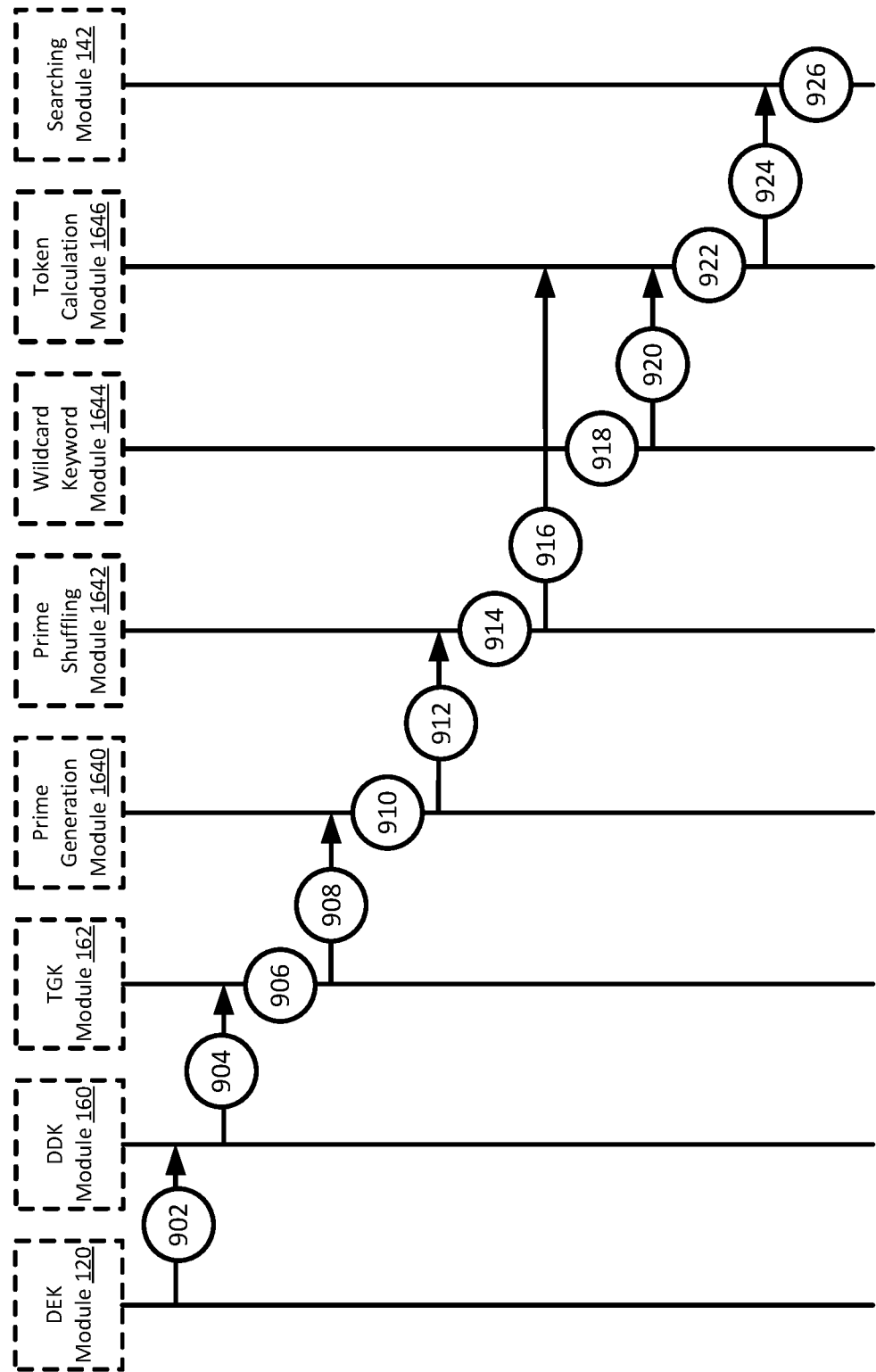
FIG. 9A and FIG. 9B schematically depict a method of searching and decrypting encrypted data according to certain embodiments of the present disclosure.
Figure 9B:
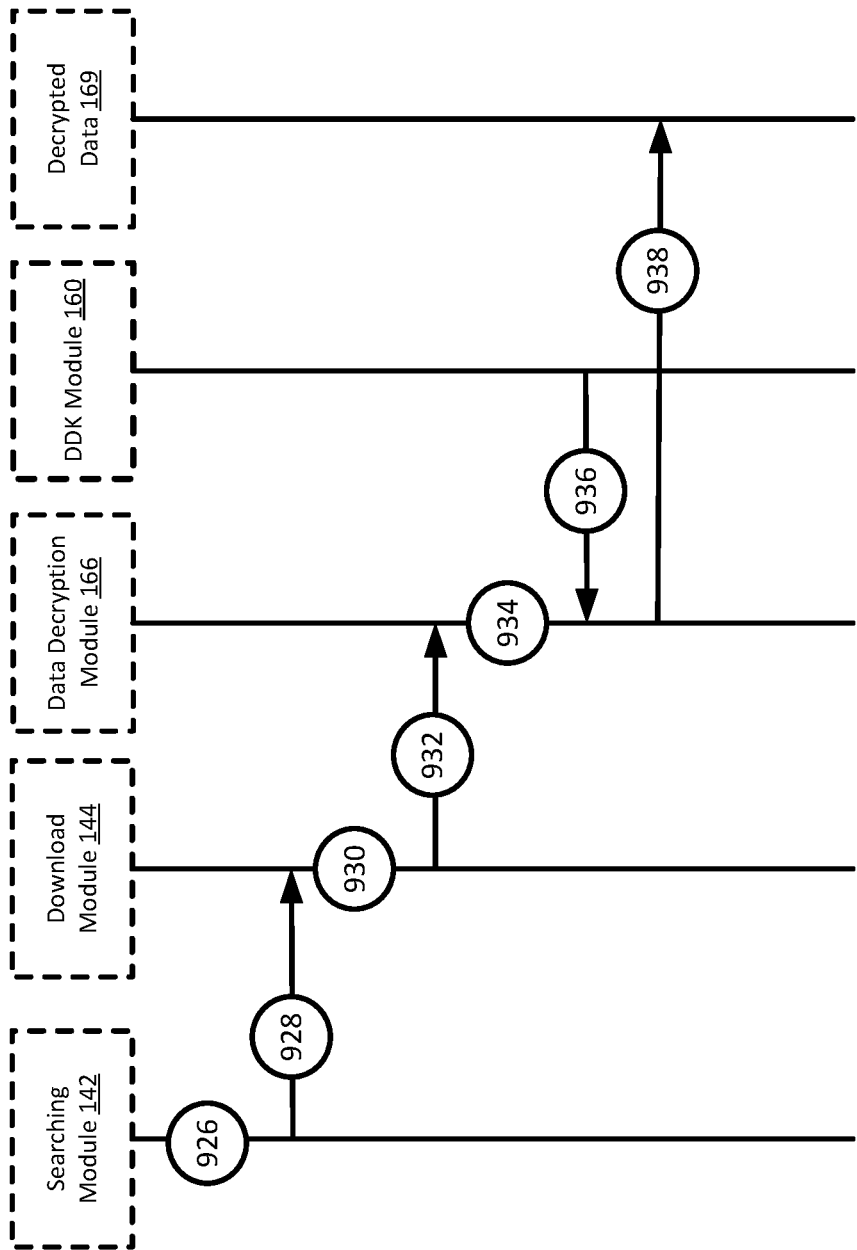

FIG. 8 schematically depicts a method 800 of encrypting and indexing data according to certain embodiments of the present disclosure, and FIG. 9A and FIG. 9B schematically depict a method 900 of searching and decrypting encrypted data according to certain embodiments of the present disclosure. FIGS. 8, 9A and 9B schematically show operating of a system for searching encrypting data using wildcard keywords according to certain embodiments of the present disclosure, where FIG. 8 shows encryption of data, indexing of the data, and uploading of the data and the index from the data provider 110 to the storage server 130, and FIGS. 9A and 9B show the preparation of token, searching the encrypted data using the token and the index, and downloading the encrypted data based on the searching result from the storage server 130 to the data consumer 150. In certain embodiments, the methods in FIGS. 8, 9A and 9B are implemented by the system shown in FIG. 1. It should be particularly noted that, unless otherwise stated in the present disclosure, the steps of the method may be arranged in a different sequential order, and are thus not limited to the sequential order as shown in FIGS. 8, 9A and 9B.

FIG. 8 shows uploading of encrypted data from the data provider 110 onto the data server 130. As shown in FIG. 8, at procedure 802, the DEK module 120 generates a DEK, sends the DEK to the data encryption module 124 at procedure 804, and sends the DEK to the IEK module 122. In certain embodiments, the DKE module 120 uses a symmetrical encryption or asymmetrical encryption. In certain embodiments, the DKE module 120 uses an algorithm selected from any one of AES, RC4, DES, RC5, and RC6. In certain embodiments, the DKE module 120 uses AES to generate an AES as the DEK, and the AES may be any one of AES-128, AES-192, and AES-256.

At procedure 804 the DEK module 120 sends the DEK to the data encryption module 124. The data encryption module 124, at procedure 806, upon receiving the DEK from the DEK module 120, encrypt the data 129 to obtain encrypted data. Then the data encryption module 124 sends the encrypted data or an identification or location of the encrypted data to the operation module 128 at procedure 808.

At procedure 810, the DEK module 120 sends the DEK to the IEK module 122.

At procedure 812, upon receiving the DEK, the IEK module 122 generates an IEK by processing the DEK using a KDF function, that is, IEK=KDF (DEK). In certain embodiments, the KDF is a secure hash function, such as SHA-256.

At procedure 814, after generating the IEK, the IEK module 122 sends the IEK to the prime generation module 1260.

At procedure 816, upon receiving the IEK, the prime generation module 1260 generates N×M primes, where N is the character size of the characters in the keywords, M is the length of the keywords. In certain embodiments, the generated primes are in a form of an N×M array or a simple sequence of primes. In certain embodiments, the primes are in an increasing order start from 2 without skipping any prime numbers. In other embodiments, the primes may be selected from the mathematically available primers using a specific rule. In certain embodiments, N and M are defined in the prime generation module 1260 in advance. Alternatively, the prime generation module 1260 may receive the positive integers N and M from a user input or extracted from analyzing the data 129. For example, the N and M may be determined by analyzing the value and the length of a column item of the data 129.

At procedure 818, the prime generation module 1260 sends the N×M primes to the prime shuffling module 1262.

At procedure 820, upon receiving the N×M primes, the prime shuffling module 1262 shuffles the primes to obtain shuffled primes. In certain embodiments, the prime shuffling module 1262 performs the shuffling operation using the IEK as seeds. Therefore, with the same IEK and the same shuffling function, the obtained shuffled primes are the same. In other words, the random numbers generated for shuffling are pseudo-random numbers.

At procedure 822, after obtaining the shuffled primes, the prime shuffling module 1262 sends the shuffled primes to the index calculation module 1266.

In certain embodiments, the procedures of generating the shuffled primes may be performed in advance, such that the procedures of encrypting data and keywords and uploading the data can use the shuffled primes when necessary. In other embodiments, the procedures of generating the shuffled primes and encrypting the data and the keywords to obtain encrypted data and indexes are performed sequentially when there is a need to encrypt and upload data.

At procedure 824, the keyword obtaining module 1264 extracts keywords from the data 129. In certain embodiments, the data 129 is a data base, and the keyword obtaining module 1264 is an SQL query that retrieves a column of the database that corresponding to one attribute, such as telephone numbers of customers.

At procedure 826, after obtaining the keywords, the keyword obtaining module 1264 sends the obtained keywords to the index calculation module 1266.

At procedure 828, upon receiving the shuffled primes and the keywords, the index calculation module 1266 calculates an index for each of the keywords using the shuffled primes. In certain embodiments, each character in the keywords is selected from N items, the N items for example is 10 numbers from 0-9, 26 alphabetic characters from a to z, 52 alphabetic characters including the lowercase characters a to z and uppercase characters A to Z; and each keywords has a length of M, such as 11 digit telephone number, 9 digit social security number, or a fixed length text containing consumer names. The index calculation module 1266 first determines a corresponding prime number for each character in a keyword by primes[p*(M−1)+c % N], which is the location of the corresponding prime in the N×M prime array. Then the index calculation module 1266 calculate the product of the corresponding primes of the characters in the keyword, the product is the index of the keyword. Each of the extracted keywords is calculated with a specific index this way.

At procedure 830, the index calculation module 1266 sends the indexes of all the keywords to the operation module 128.

At procedure 832, upon receiving the encrypted data (or the identification or location of the encrypted data) and the indexes, the operation module 128 combines the encrypted data and indexes, and at procedure 834, sends the combined encrypted data and its indexes to the storage server 130. The storage server 130, specifically the upload module 140, subsequently stores the encrypted data and the indexes of the encrypted data, where the encrypted data and its corresponding indexes are linked through an identification of the encrypted data, or are stored together using predetermined arrangement.

FIGS. 9A and 9B shows, when the encrypted data and the indexes are available on the storage server 130, searching the indexes using wildcard search, and downloading corresponding encrypted data that have matched indexes from the data server 130 to the data consumer 150.

As shown in FIGS. 9A and 9B, at procedure 902, the DEK module 120 of the data provider 110 shares the DEK with the DDK module 160 of the data consumer 150, where the DDK is the same as the DEK.

At procedure 904, upon receiving the DDK, the DDK module 160 sends the DDK to the TGK module 162.

At procedure 906, upon receiving the DDK, the TGK module 162 generate an TGK using the key derivation function (KDF). The KDF used by the TGK module 162 is the same as the KDF used by the IEK module 122, and the generated TGK by the TGK module 162 is the same as the IEK generated by the IEK module 122.

At procedure 908, the TGK module 162 sends the TGK to the prime generation module 1640.

At procedure 910, upon receiving the TGK, the prime generation module 1640 generates an N×M prime array. The prime array generated by the prime generation module 1640 is the same as the prime array generated by the prime generation module 1260.

At procedure 912, after obtaining the N×M prime array and the TGK, the prime generation module 1640 sends the N×M prime array and the TGK to the prime shuffling module 1642.

At procedure 914, upon receiving the N×M prime array and the TGK, the prime shuffling module 1642 generate random numbers using the TGK as seeds, and shuffles the N×M prime array as described above.

At procedure 916, after obtaining the shuffled N×M prime array, the prime shuffling module 1642 sends the shuffled N×M prime array to the token calculation module 1646. In certain embodiments, the procedures 902 to 916 are performed in advance, and the token calculation module 1646 retrieves the shuffled N×M prime array when needed.

At procedure 918, the wildcard keyword module 1644 receives a wildcard keyword from a user input. In certain embodiments, the user may input the wildcard keyword using an interface, such as a graphic user interface (GUI), to the wildcard keyword module 1644 of the storage consumer 150. Then at procedure 920, the wildcard keyword module 1644 sends the wildcard keyword to the token calculation module 1646.

At procedure 922, upon receiving the wildcard keyword and the shuffled N×M prime array, the token calculation module 1646 calculate a token for the wildcard keyword using the shuffled N×M prime array. In certain embodiments, the token calculation module 1646 may retrieve the shuffled N×M prime array after receiving the wildcard keyword. In certain embodiments, the token calculation module 1646 may not need to retrieve the shuffled N×M prime array completely. Instead, it checks the shuffled N×M prime array during the calculation of the token, where the N×M prime array is stored in a predetermined location in the storage device 156. As described above, the token calculation module 1646 calculates the value of the formula $[p*(M-1)+c \% N]$ and checks the corresponding primes in the shuffled N×M prime array for each non-wildcard character in the wildcard keyword, and uses the product of the primes of the non-wildcard characters as the token for the wildcard keyword. As described above, when more than one characters in the wildcard keyword are unknown and represented by wildcard symbols, the wildcard keyword is termed "multi-character wildcard keyword."

At procedure 924, after obtaining one or more tokens, each token corresponding to a wildcard keyword, the token calculation module 1646 prepares a download request having the one or more tokens, and sends the download request to the searching module 142 of the storage server 130.

At procedure 926, upon receiving the download request, the searching module 142 extracts the tokens from the download request, search each of the tokens against indexes of the encrypted data 146. When an index is divided with no remainder by the token, the searching module 142 determines that there is a match between the token and the index, and as a result, determines the encrypted data having the index as searched result of the token. When a token corresponds to a wildcard keyword that has more than wildcard characters (unknown characters), the search is termed "multi-character wildcard search."

Then at procedure 928, the searching module 142 sends the location or path of the encrypted data, and optionally the match between the token and the index, to the download module 144.

At procedure 930, upon receiving the path(s) of the encrypted data corresponding to the matched indexes, the download module 144 retrieves these encrypted data, and then at procedure 932, sends the encrypted data to the data decryption module 166. In certain embodiments, the download module 144 may also send the matched result between the token and the indexes to the data decryption module 166, such that those information are also accessible to the user for further analyzing the downloaded data.

At procedure 934, upon receiving the encrypted data, the data encryption module 166 retrieves the DDK corresponding to the encrypted data from the DDK module 160 at procedure 936, decrypts the encrypted data using the retrieved DDK, and sends and stores the decrypted result as the decrypted data 169 at procedure 938. In certain embodiments, the DDK and the corresponding encrypted data has certain identifications, such as a time stamp, to match the correct DDK for a specific encrypted data.

In certain aspects, the present invention relates to a non-transitory computer readable medium storing computer executable code. In certain embodiments, the computer executable code may be the software stored in the storage device 116, 136 or 156 as described above. The computer executable code, when being executed, may perform the methods or part of the methods described above. In certain embodiments, the non-transitory computer readable medium may include, but not limited to, the storage device 116, 136 or 156 as described above, or any other storage media of the data provider 110, the storage server 130 or the data consumer 150.

In certain aspects, the present disclosure provides a new method to support wildcard searches over encrypted data indexed by any encoded keywords of fixed length. In certain embodiments, the present disclosure has, among other things, the following advantages: 1) data consumer is capable to search over encrypted data without decrypting all the ciphertext data; 2) Index encryption is computationally efficient on the data provider side when uploading the data to the storage server; 3) Token generation is computationally efficient on the data consumer side when searching over the encrypted data; 4) The server only needs to do modulus operations for each encrypted index, which is lightweight on the server side; 5) Depending on application scenarios, the search algorithm could be converted into SQL queries directly, thus much easier to deploy than other technologies where user defined function has to be implemented on the database server end.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. U.S. Pat. No. 8,429,421 B2, Server-side encrypted pattern matching.
2. U.S. Pat. No. 8,549,653, Secure wildcard searchable database.
3. U.S. Pat. No. 8,930,691, Dynamic symmetric searchable encryption.
4. U.S. Pat. No. 9,679,155 B1, Prefix search over encrypted text.
5. U.S. Pat. No. 9,760,637 B2, Wildcard search in encrypted text using order preserving encryption.
6. U.S. Published Patent Application No. 2009/0113213 A1, System and method for searching encrypted numerical data.
7. U.S. Published Patent Application No. 2014/0233727 A1, Method for secure substring search.
8. Boneh, Dan, et al., Public key encryption with keyword search, International conference on the theory and applications of cryptographic techniques, 2004, 3027: 506-522.
9. Boldyreva, Alexandra, et al., Order-preserving symmetric encryption, Annual International Conference on the Theory and Applications of Cryptographic Techniques, 2009, 5479: 224-241.
10. Cash, David, et al., Highly-scalable searchable symmetric encryption with support for boolean queries, Advances in cryptology—CRYPTO 2013, 2013, 8042: 353-373.
11. Cash, David, et al., Dynamic searchable encryption in very-large databases: data structures and implementation, 2014, IACR Cryptology ePrint Archive, 2014: 853.
12. Zhao, Fangming, and Takashi Nishide, Searchable Symmetric Encryption Supporting Queries with Multiple-Character Wildcards, International Conference on Network and System Security, 2016, pp 266-282.
13. https://en.wikipedia.org/wiki/Fisher-Yates_shuffle
14. https://nlp.stanford.edu/IR-book/html/htmledition/permuterm-indexes-1.html
15. https://en.wikipedia.org/wiki/Random_number_generation
16. https://en.wikipedia.org/wiki/Varchar
17. https://en.wikipedia.org/wiki/Pairing

What is claimed is:

1. A method for providing wildcard keyword search upon encrypted data, comprising:
   providing, by a first computing device, a data encryption key (DEK);
   providing, by the first computing device, data for being encrypted, wherein the data comprises a keyword having M number of characters, each of the characters is selected from N number of predetermined characters, and M and N are positive integers;
   encrypting, by the first computing device, the data into encrypted data using the DEK;
   calculating, by the first computing device, an index encryption key (IEK) from the DEK using a key derivation function (KDF);
   providing M×N number of primes;
   shuffling the M×N number of primes based on the IEK to form a sequence of primes;
   calculating, for each character in the keyword, a sequential value according to a position of the character in the keyword and a value of the character in the keyword;
   selecting a first prime from the sequence of primes for each character in the keyword according to the sequential value;
   calculating an index of the keyword, the index being a product of the first primes selected for the characters of the keyword; and
   uploading the encrypted data and the index on a second computing device, such that the encrypted data and the index are accessible by a third computing device,
   wherein the third computing device has the DEK and the KDF, and is configured to:
      generate the IEK according to the DEK and the KDF;
      provide a wildcard search keyword, wherein the wildcard search keyword has M number of characters, the M number of characters comprises at least one query character and at least one wildcard character, and the at least one query character is selected from the N number of predetermined characters;
      provide the M×N number of primes;
      shuffle the M×N number of primes based on the IEK to form the sequence of primes;
      calculate a query sequential value for the at least one query character according to a position and a value of the at least one query character in a wildcard search query;
      select a second prime from the sequence of primes for the at least one query character in the wildcard search keyword according to the query sequential value;
      calculate a query index of the wildcard search keyword, the query index being a product of the second primes selected for the at least one query character of the wildcard search keyword; and
      query the index stored in the second computing device using the query index, so as to obtain the encrypted data corresponding to the index that matches the query index.

2. The method of claim 1, wherein the sequential value for a character in a pth position in the keyword is calculated by: $p \times (M-1) + C \% N$, wherein p is an integer selected from 0 to N and representing a position of the character in the keyword, C is the character value in the pth position, and $C \% N$ is a remainder of dividing C by N.

3. The method of claim 1,
   wherein the first computing device is a data provider, the second computing device is a storage server, and the third computing device is a data consumer; and wherein the first computing device is configured to perform storage operations to the second computing device, and the third computing device is configured to send the query index to the second computer and receive a search response from the second computing device.

4. The method of claim 1, further comprising: updating the DEK on the first computing device and the second computing device at a predetermined time interval.

5. The method of claim 1, wherein the DEK is an advanced encryption standard (AES) key, and the KDF is a SHA-256 hash value function.

6. The method of claim 1, wherein the N number of predetermined characters comprises at least one of numbers 0 to 9, lowercase characters a to z, and uppercase characters A to Z.

7. The method of claim 1, wherein the step of shuffling the M×N number of primes is performed by Fisher-Yates shuffle using the IEK as seeds.

8. The method of claim 1, wherein the step of query the index comprises:
performing a modulus operation on the query index to the indexes stored in the second computing device; and
when the modulus of the query index and one of the indexes stored in the second computing device is 0, delivering the encrypted data corresponding to the one of the indexes from the second computing device to the third computing device.

9. A method for providing wildcard keyword search upon encrypted data, comprising:
obtaining, by a first computing device, a keyword for data to be encrypted, wherein the keyword has a fixed length;
generating a sequence of primes;
determining corresponding one prime from the sequence of primes for each character of the keyword; and
defining a product of the corresponding primes of the characters of the keyword as index of the encrypted data, wherein the index is searchable using a wildcard search keyword.

10. The method of claim 9, wherein the keyword has M number of characters, each of the characters is selected from N number of predetermined characters, M and N are positive integers, and the sequence of primes comprises M×N number of primes.

11. The method of claim 10, further comprising:
encrypting the data using a data encryption key (DEK) to obtain the encrypted data;
processing the DEK using a key derivation function (KDF) to obtain an index encryption key (IEK);
obtaining sequentially increasing M×N number of primes from 1; and
shuffling the sequentially increasing M×N number of primes, using random shuffling with the IEK as seeds, to obtain the sequence of primes.

12. The method of claim 11, wherein the step of determining corresponding one prime from the sequence of primes for each character of the keyword comprises:
calculating, for each character in the keyword, a sequential value using p×(M−1)+C % N, wherein p is an integer selected from 0 to N and representing a position of the character in the keyword, C is the character value in the pth position, and C % N is a remainder of dividing C by N; and
selecting, for each character in the keyword, a prime at a position of the sequential value in the sequence of primes.

13. The method of claim 12, wherein the wildcard search keyword has M number of characters, the M number of characters comprises at least one query character and at least one wildcard character, and the at least one query character is selected from the N number of predetermined characters.

14. The method of claim 13, further comprising:
uploading the index and the encrypted data onto a storage server;
calculating a query sequential value for at least one query character of the wildcard search keyword according to a position and a value of the at least one query character in the wildcard search keyword;
calculating a query index of the wildcard keyword, the query index being a product of query primes selected for the at least one query character of the wildcard search keyword; and
querying the index on the storage server using the query index.

15. The method of claim 14, further comprising, when the query index matches the index on the storage server: downloading encrypted data corresponding to the index.

16. A non-transitory computer readable medium storing computer executable code, wherein the computer executable code, when executed at a processor of a computing device, is configured to perform the method of claim 9.

17. A system for providing wildcard keyword search upon encrypted data, the system comprising a first computing device, the first computing device comprising a processor and a storage device storing computer executable code, the computer executable code, when executed at the processor, causing the processor to perform following steps:
obtaining a keyword for data to be encrypted, wherein the keyword has a fixed length;
generating a sequence of primes;
determining corresponding one prime from the sequence of primes for each character of the keyword; and
defining a product of the corresponding primes of the characters of the keyword as index of the encrypted data, wherein the index is searchable using a wildcard search keyword.

18. The system of claim 17, wherein the keyword has M number of characters, each of the characters is selected from N number of predetermined characters, M and N are positive integers, the sequence of primes comprises M×N number of primes, and the computer executable code further causes the processor to perform following steps:
encrypting the data using a data encryption key (DEK) to obtain the encrypted data;
processing the DEK using a key derivation function (KDF) to obtain an index encryption key (IEK);
obtaining sequentially increasing M×N number of primes from 1; and
shuffling the sequentially increasing M×N number of primes, using random shuffling with the IEK as seeds, to obtain the sequence of primes.

19. The system of claim 18, wherein the computer executable code causes the processor to perform the step of determining corresponding one prime from the sequence of primes for each character of the keyword by:
calculating, for each character in the keyword, a sequential value using p×(M−1)+C % N, wherein p is an integer selected from 0 to N and representing a position of the character in the keyword, C is the character value in the pth position, and C % N is the remainder of dividing C by N; and selecting, for each character in the keyword, a prime at a position of the sequential value in the sequence of primes.

20. The system of claim 19, wherein the wildcard search keyword has M number of characters, the M number of characters comprises at least one query character and at least one wildcard character, and the at least one query character is selected from the N number of predetermined characters, and wherein the computer executable code further causes the processor to perform following steps:

uploading the index and the encrypted data onto a storage server;

calculating a query sequential value for at least one query character of the wildcard search keyword according to a position and a value of the at least one query character in the wildcard search keyword;

calculating a query index of the wildcard keyword, the query index being a product of query primes selected for the at least one query character of the wildcard search keyword;

querying the index on the storage server using the query index; and when the query index matches the index on the storage server: downloading the encrypted data corresponding to the index.

* * * * *